ent [19]
Sakakibara et al.

[11] 3,894,091
[45] July 8, 1975

[54] PROCESS FOR PRODUCTION OF ACROLEIN
[75] Inventors: Kouzou Sakakibara; Iwao Abe; Kazuyuki Matsuoka, all of Saitama, Japan
[73] Assignee: Daicel Ltd., Osaka, Japan
[22] Filed: July 5, 1973
[21] Appl. No.: 376,317

[30] Foreign Application Priority Data
July 6, 1972  Japan.............................. 47-68001

[52] U.S. Cl........... 260/604 R; 260/533 N; 252/454
[51] Int. Cl............................................. C07c 45/04
[58] Field of Search.................................. 260/604 R

[56] References Cited
UNITED STATES PATENTS
3,338,952  8/1967  Callahan et al.................. 260/604 R
FOREIGN PATENTS OR APPLICATIONS
991,085  5/1965  United Kingdom............. 260/604 R
OTHER PUBLICATIONS
Hagiwara, K., Chemical Abstracts, Vol. 75, 35094j, 1971.

*Primary Examiner*—Bernard Helfin
*Assistant Examiner*—R. H. Liles
*Attorney, Agent, or Firm*—Woodhams, Blanchard and Flynn

[57] ABSTRACT

Acrolein is produced by catalytically oxidizing propylene in the gas phase with a molecular oxygen-containing gas, characterized by conducting the reaction in the presence of a metal oxide catalyst, the metal content of which is expressed by the following empirical formula:

$$(Mo)_a(Bi)_b(Fe)_c(Sb)_d(L)_e$$

wherein:
L is one or more metals selected from K, Rb and Cs, and $a$, $b$, $c$, $d$ and $e$ are the numbers of atoms of Mo, Bi, Fe, Sb and L, respectively, $a$ being 12, $b$ being from 0.5 to 6, $c$ being from 3 to 12, $d$ being from 0.01 to 1.0, and $e$ being from 0.1 to 1.0.

6 Claims, No Drawings

PROCESS FOR PRODUCTION OF ACROLEIN

BACKGROUND OF THE INVENTION

1. Field of the Invention

This invention relates to a process for the production of acrolein by catalytically oxidizing propylene in the gas phase, in the presence of a catalyst, with a molecular oxygen-containing gas.

A primary object of the invention is to provide a catalyst which can be prepared easily and which can be handled with ease when it is used for industrial practice of the above oxidation reaction, and to provide a catalyst which can give good results as regards the conversion, selectivity and catalyst life with high reproducibility.

2. Description of the Prior Art

Catalysts of the molybdenum system, especially catalysts of the molybdenum-bismuth-iron system, are known in the art and are recommended for use as a catalyst in the catalytic gas-phase reaction of $\alpha,\beta$-unsaturated hydrocarbons represented by propylene.

However, none of these catalysts is satisfactory as regards their ease of handling and their reaction results in the industrial practice of the above catalytic oxidation. More specifically although acrolein is obtained in a high onepass formation ratio as high as about 70% by the processes disclosed in Japanese Patent Publication No. 4771/69 (molybdenum-bismuth-iron-arsenic catalyst) and in Japanese Patent Publication No. 6246/69 (nickel-cobalt-molybdenum-bismuth-iron-arsenic catalyst), because the arsenic components contained in the catalysts in the form of arsenic oxide are readily volatilized away, depending on the conditions or procedures of the process or because of their inherent properties, the activity of the catalysts is reduced with the passage of time, and their life is much shortened. What is more important is that, as is well known in the art, arsenic compounds are highly poisonous, and a serious problem is involved in the preparation and handling of such catalysts, such as the operations of charging the catalysts into reactors and withdrawing them therefrom. Accordingly a process using such catalysts is not suitable as an industrial process.

Although the process proposed in the specification of Dutch Patent No. 7017923 (molybdenum-bismuth-iron-antimony catalyst) does not involve a problem of poisons in the catalyst encountered in the preparation or handling thereof, the conversion of propylene or isobutylene using same is as low as 30–50%.

SUMMARY OF THE INVENTION

We have discovered catalysts which are satisfactory as regards the ease of handling same and which give good results in the industrial practice of the reaction.

This invention provides a process for the production of acrolein by catalytically oxidizing propylene in the gas phase with a molecular oxygen-containing gas, in which the reaction is carried out in the presence of a metal oxide catalyst, the metal content of which is expressed by the following empirical formula:

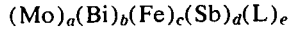

$(Mo)_a(Bi)_b(Fe)_c(Sb)_d(L)_e$ wherein:

L is one or more metals selected from the group consisting of K, Rb and Cs, and $a$, $b$, $c$, $d$ and $e$ are the numbers of atoms of Mo, Bi, Fe, Sb and L, respectively, $a$ being 12, $b$ being from 0.5 to 6, $c$ being from 3 to 12, $d$ being from 0.01 to 1.0 and $e$ being from 0.1 to 1.0.

An initial finding related to the invention was that catalysts of the Mo-Bi-Fe-As system previously proposed by us in Japanese Patent Publication No. 4771/69 and improved catalysts (Mo-Bi-Fe-Sb) thereof are not completely satisfactory as regards the reaction results, especially the conversion of propylene. However, when catalyst compositions of this invention expressed by the above empirical formula are used, conspicuously improved results can be obtained as regards not only the conversion but also the selectivity and the catalyst life. It is taught, for instance, in Japanese Patent Publication No. 11965/72, that in the oxidation reaction of olefins the selectivity of the intended product can be improved by the incorporation of potassium, rubidium and cesium into the catalyst of Sb-V-Fe-Bi system. However, it must be noted that in the process of the present invention it is the conversion of propylene that is effectively improved by incorporation of such alkali metal components.

The catalyst of this invention is expressed by the foregoing empirical formula of $(Mo)_a(Bi)_b(Fe)_c(Sb)_d(L)_e$ and is an oxide, or a mixture composed of the elements molybdenum, bismuth, iron, antimony, alkali metal (L) and oxygen. Such catalyst-constituent metal oxides may be used with an ordinary catalyst carrier such as silica, silica-alumina, diatomaceous earth and pumice. An especially preferred carrier is silica gel or silica sol. The metal oxide concentration in the carrier is not particularly critical, but from the economical viewpoint, the concentration should be chosen within such a range as will not reduce the formation ratio and selectivity of acrolein. It is desired, therefore, that the metal oxide concentration in the total catalyst composition is 25 to 40% by weight of the total weight of the catalyst composition including the carrier.

Any metal salts that can readily be converted to the corresponding oxides by thermal decomposition can be used in the preparation of the catalysts of this invention. It is especially preferred to employ nitrates, sulfates or ammonium salts of metals and alkali metal salts. In addition, organic acid salts and complex salts can be used.

In this invention, the gas-phase, catalytic oxidation of propylene can be accomplished by any of the conventional fluidized bed and solid bed procedures. Further, in case the conversion of starting propylene is low it is feasible to employ a process or apparatus in which recovery and recycling of unreacted propylene can be conducted.

Propylene to be used in this invention need not have an especially high purity. Commercially available propylene of ordinary purity can be used in this invention. In other words, the co-presence of such hydrocarbons as ethylene, ethane, propane and butane does not bring about any particular disadvantage. As the molecular oxygen-containing gas, oxygen and air are used in this invention and the use of air is especially preferred. The feed ratio (mol ratio) of oxygen to propylene is preferably from 1:0.5 to 1:2. In order to improve the formation ratio of acrolein and to remove a danger involved in the oxidation reaction, such as explosion, it is important to dilute the starting propylene gas with steam. The mixing ratio (mole ratio) of propylene:steam is 1:2 to 10. A gaseous mixture of the foregoing starting materials is sufficiently blended and pre-heated at 200°–300°C. The reaction temperature is 250°–400°C, preferably 300°–350°C, and the apparent contact time between the catalyst and gas is 0.1–10 seconds, preferably 0.5–5 seconds.

The values of the conversion of propylene and the selectivity and formation ratio of acrolein referred to in the text of the instant specification and examples are calculated according to the following formulae:

$$\text{Conversion of propylene (mole \%)} = \frac{\text{number of moles of reacted propylene}}{\text{number of moles of fed propylene}} \times 100$$

$$\text{Selectivity of acrolein (mole \%)} = \frac{\text{number of moles of formed acrolein}}{\text{number of moles of reacted propylene}} \times 100$$

$$\text{Formation ratio of acrolein (mole \%)} = \frac{\text{number of moles of formed acrolein}}{\text{number of moles of fed propylene}} \times 100$$

The values of selectivity and formation ratio of by-products other than acrolein are obtained by dividing the number of carbon moles of the formed by-product by the number of carbon moles of reacted and fed propylene, respectively.

DETAILED DESCRIPTION OF THE INVENTION

The effects of this invention will now be further described in more detail by reference to the following illustrative examples.

EXAMPLE 1

17.22 Parts by weight of ammonium molybdate and 0.59 part by weight of antimony oxide ($Sb_2O_3$) were dissolved with heating into 150 cc of an aqueous solution of ammonia. Separately, 24.64 parts by weight of ferric nitrate, 7.89 parts by weight of bismuth nitrate and 0.25 parts by weight of potassium nitrate were dissolved with heating in a solution acidified with nitric acid, and the resulting solution was added to the above ammonia solution containing molybdenum and antimony. Then 50 parts by weight of silica gel, pulverized to pass through a 150-mesh sieve (Japanese Industrial Standard, were added to the mixed solution, and the mixture was heated and concentrated. The resulting solid was dried in air at 120°C, and the decomposition was carried out by heating same at 350°C for 2 hours. The decomposition product was pulverized, molded into cylindrical pellets having a size of 5 mm (in diameter) × 5 mm (in length) and calcined at 540°C for 4 hours in air to obtain a catalyst composition. The atomic ratio of the metals in the thus-obtained catalyst composition was expressed by the formula $Mo_{12}Bi_2Fe_{7.5}Sb_{0.3}K_{0.3}$ and the metal oxide concentration in the catalyst composition was 33% by weight. This catalyst is designated as catalyst No. 1.

60 cc of the thus-obtained catalyst was packed in a stainless steel reaction vessel having an inner diameter of 27 mm, and the gas-phase, catalytic oxidation of propylene was carried out under the following conditions while immersing the reaction vessel in a salt bath:

| | |
|---|---|
| propylene ratio | 6 mole % |
| air ratio | 42.8 mole % |
| steam ratio | 51.2 mole % |
| contact time | 2.4 seconds |
| maximum temperature in catalyst layer | 340°C |

The results obtained were a propylene conversion of 90.8%, an acrolein selectivity of 81.5% and a one-pass formation ratio of acrolein of 74.0%. In addition to acrolein, there were obtained acrylic acid, carbon monoxide and carbon dioxide gas at formation ratios of 7.1, 3.1 and 4.9%, respectively. The above salt bath is a molten salt bath consisting of 3% $NaNO_3$, 50% $KNO_3$ and 47% $NaNO_2$ by weight.

EXAMPLES 2 to 19

Cylindrical molded catalyst pellets having a size of 5 mm (in diameter) × 5 mm (in length) and having a metal oxide concentration of 33% by weight were prepared in the same manner as in Example 1 by employing silica gel as a carrier and changing the amounts used of the salts as indicated in Table 1. In some examples, potassium pyroantimonate was used instead of antimony oxide.

Table 1

| Example No. | Catalyst No. | Ammonium molybdate (parts by weight) | Ferric nitrate (parts by weight) | Bismuth nitrate (parts by weight) | Potassium nitrate (parts by weight) | Potassium pyroantimonate (parts by weight) | Antimony oxide (parts by weight) | Composition of catalyst metals (atomic ratio) |
|---|---|---|---|---|---|---|---|---|
| 2 | 2 | 18.39 | 26.31 | 8.42 | — | 0.66 | — | $Mo_{12}Bi_2Fe_{7.5}Sb_{0.3}K_{0.3}$ |
| 3 | 3 | 16.79 | 23.98 | 7.68 | 0.25 | — | 1.15 | $Mo_{12}Bi_2Fe_{7.5}Sb_{1.0}K_{0.3}$ |
| 4 | 4 | 20.04 | 28.66 | 4.59 | — | 0.72 | — | $Mo_{12}Bi_1Fe_{7.5}Sb_{0.3}K_{0.3}$ |
| 5 | 5 | 15.80 | 22.60 | 14.48 | — | 0.57 | — | $Mo_{12}Bi_4Fe_{7.5}Sb_{0.3}K_{0.3}$ |
| 6 | 6 | 18.74 | 26.82 | 4.29 | — | 1.12 | — | $Mo_{12}Bi_1Fe_{7.5}Sb_{0.5}K_{0.5}$ |
| 7 | 7 | 18.20 | 26.06 | 8.33 | — | 1.10 | — | $Mo_{12}Bi_2Fe_{7.5}Sb_{0.5}K_{0.5}$ |
| 8 | 8 | 14.80 | 21.20 | 13.55 | — | 0.89 | — | $Mo_{12}Bi_{4.5}Fe_{7.5}Sb_{0.5}K_{0.5}$ |
| 9 | 9 | 17.75 | 25.40 | 8.12 | — | 2.13 | — | $Mo_{12}Bi_2Fe_{7.5}Sb_1K_1$ |
| 10 | 10 | 14.01 | 20.04 | 14.43 | — | 1.67 | — | $Mo_{12}Bi_{4.5}Fe_{7.5}Sb_1K_1$ |
| 11 | 11 | 15.33 | 21.91 | 14.03 | 0.25 | — | 1.05 | $Mo_{12}Bi_{4.5}Fe_{7.5}Sb_1K_{0.3}$ |
| 12 | 12 | 19.57 | 18.66 | 8.96 | — | 1.17 | — | $Mo_{12}Bi_2Fe_5Sb_{0.5}K_{0.5}$ |
| 13 | 13 | 16.67 | 15.88 | 15.26 | — | 1.00 | — | $Mo_{12}Bi_4Fe_5Sb_{0.5}K_{0.5}$ |
| 14 | 14 | 18.96 | 32.53 | 4.34 | — | 1.14 | — | $Mo_{12}Bi_1Fe_9Sb_{0.5}K_{0.5}$ |
| 15 | 15 | 17.48 | 29.99 | 8.00 | — | 1.05 | — | $Mo_{12}Bi_2Fe_9Sb_{0.5}K_{0.5}$ |
| 16 | 16 | 15.12 | 25.94 | 13.84 | — | 0.91 | — | $Mo_{12}Bi_3Fe_9Sb_{0.5}K_{0.5}$ |
| 17 | 17 | 17.22 | 24.64 | 7.89 | () | — | 0.59 | $Mo_{12}Bi_2Fe_{7.5}Sb_{0.5}K_{0.6}$ |
| 18 | 18 | 17.22 | 24.64 | 7.89 | () | — | 0.59 | $Mo_{12}Bi_2Fe_{7.5}Sb_{0.5}K_{0.9}$ |
| 19 | 19 | 18.20 | 26.06 | 8.33 | ( | — | — | $Mo_{12}Bi_2Fe_{7.5}Sb_{0.5}K_{1.0}$ |

Using the thus-obtained eighteen catalysts, gas-phase, catalytic oxidation reactions of propylene were carried out under the same conditions as in Example 1 to obtain the results shown in Table 2.

Table 2

One-Pass Formation Ratio (%)

| Catalyst No. | Propylene conversion (%) | Acrolein | Acrylic acid | Carbon monoxide | Carbon dioxide gas | Selectivity of Acrolein (%) |
|---|---|---|---|---|---|---|
| 2  | 85.2 | 69.8 | 6.1 | 2.2 | 4.0 | 81.9 |
| 3  | 78.8 | 64.3 | 6.7 | 2.8 | 4.5 | 81.7 |
| 4  | 80.4 | 62.4 | 6.7 | 2.8 | 5.6 | 77.6 |
| 5  | 88.4 | 69.0 | 6.4 | 2.8 | 4.7 | 78.2 |
| 6  | 85.2 | 72.6 | 5.6 | 1.8 | 2.9 | 85.2 |
| 7  | 87.3 | 72.9 | 4.6 | 1.6 | 2.6 | 83.4 |
| 8  | 83.4 | 66.2 | 5.1 | 2.5 | 3.8 | 79.4 |
| 9  | 82.0 | 62.2 | 4.3 | 1.5 | 2.1 | 75.9 |
| 10 | 74.0 | 61.8 | 4.7 | 2.1 | 3.1 | 83.5 |
| 11 | 84.3 | 70.4 | 6.1 | 2.5 | 4.1 | 83.5 |
| 12 | 76.5 | 66.6 | 3.7 | 1.5 | 2.1 | 87.0 |
| 13 | 85.7 | 69.4 | 5.5 | 2.0 | 3.1 | 81.0 |
| 14 | 75.7 | 59.7 | 5.1 | 2.2 | 2.6 | 78.9 |
| 15 | 81.4 | 68.8 | 5.2 | 1.5 | 2.8 | 84.5 |
| 16 | 82.9 | 61.6 | 6.0 | 2.9 | 4.7 | 74.3 |
| 17 | 87.3 | 72.2 | 6.2 | 2.5 | 4.2 | 82.6 |
| 18 | 78.3 | 67.5 | 5.0 | 1.4 | 2.7 | 86.3 |
| 19 | 81.1 | 66.8 | 4.6 | 1.3 | 2.4 | 82.3 |

EXAMPLES 20–22

In the same manner as in Example 1, cylindrical molded catalyst pellets having a size of 5 mm (in diameter) × 5 mm (in length) and having a metal oxide concentration of 33% by weight, were prepared by employing rubidium nitrate or cesium nitrate, instead of the potassium nitrate used in Example 1. The salts used are indicated in Table 3. 20–

Table 3

| Example No. | Catalyst No. | Ammonium molybdate (parts by weight) | Ferric nitrate (parts by weight) | Bismuth nitrate (parts by weight) | Rubidium nitrate (parts by weight) | Cesium nitrate (parts by weight) | Antimony oxide (parts by weight) | Composition of Catalyst metals (atomic ratio) |
|---|---|---|---|---|---|---|---|---|
| 20 | 20 | 17.22 | 24.64 | 7.89 | 0.36 | —    | 0.59 | $Mo_{12}Bi_2Fe_{7.5}Sb_{0.5}Rb_{0.3}$ |
| 21 | 21 | 17.22 | 24.64 | 7.89 | 0.25 | —    | 0.59 | $Mo_{12}Bi_2Fe_{7.5}Sb_{0.5}Rb_{0.2}$ |
| 22 | 22 | 17.22 | 24.64 | 7.89 | —    | 0.20 | 0.59 | $Mo_{12}Bi_2Fe_{7.5}Sb_{0.5}Cs_{0.1}$ |

Using the thus-obtained catalysts, gas-phase, catalytic oxidation reactions of propylene were carried out under the same conditions as in Example 1 and the results shown in Table 4 were obtained.

Table 4

One-Pass Formation Ratio (%)

| Catalyst No. | Propylene conversion (%) | Acrolein | Acrylic acid | Carbon monoxide | Carbon dioxide gas | Selectivity of Acrolein (%) |
|---|---|---|---|---|---|---|
| 20 | 76.7 | 64.9 | 5.9 | 2.6 | 4.4 | 84.6 |
| 21 | 74.9 | 62.8 | 5.9 | 3.1 | 5.0 | 83.8 |
| 22 | 85.9 | 63.8 | 6.6 | 2.8 | 4.7 | 74.2 |

The embodiments of the invention in which an exclusive property or privilege is claimed are defined as follows:

1. In a process for the production of acrolein by catalytically oxidizing propylene in the gaseous phase with a molecular oxygen-containing gas, at a temperature of 250° to 400°C., the improvement which comprises conducting the reaction in the presence of a metal oxide catalyst, the metal content of which is expressed by the following empirical formula:

$$(Mo)_a(Bi)_b(Fe)_c(Sb)_d(L)_e$$

in which L is one or more metals selected from the group consisting of K, Rb and Cs, and $a$, $b$, $c$, $d$ and $e$ represent the numbers of atoms of Mo, Bi, Fe, Sb and L, respectively, $a$ being 12, $b$ being 0.5 to 6, $c$ being 3 to 12, $d$ being 0.01 to 1.0, and $e$ being 0.1 to 10.

2. The process according to claim 1, in which the oxygen-containing gas is air, and the oxygen to propylene mole ratio is 1:0.5 to 1:2.

3. The process according to claim 2, in which the propylene feed gas is mixed with steam in the ratio of 1:2 to 10.

4. The process according to claim 3, in which a gaseous mixture of propylene, air and steam comprises a feed mixture that is blended and preheated at 200° to 300°C.

5. The process according to claim 1, in which the catalyst is deposited on a carrier, the amount of catalyst being from 25 to 40 percent by weight, based on the sum of catalyst plus carrier.

6. The process according to claim 5, in which the carrier is selected from the group consisting of silica, silica-alumina, diatomaceous earth and pumice.

* * * * *